Figure 1:
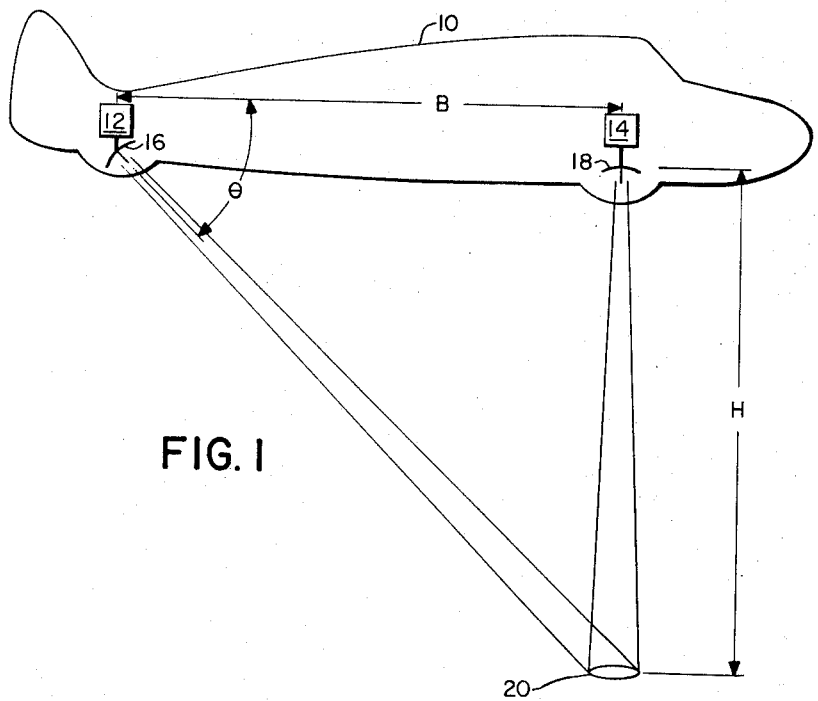

Jan. 30, 1968  A. M. GLUCK  3,366,960
MICROWAVE RADIOMETRIC NAVIGATION SYSTEM
Filed Nov. 1, 1966  3 Sheets-Sheet 1

INVENTOR.
ADOLPH M. GLUCK
BY Karl A. Ohralik
ATTORNEY

Jan. 30, 1968     A. M. GLUCK     3,366,960
MICROWAVE RADIOMETRIC NAVIGATION SYSTEM
Filed Nov. 1, 1966     3 Sheets-Sheet 2

INVENTOR.
ADOLPH M. GLUCK
BY Karl A. Ohralik
ATTORNEY

United States Patent Office 3,366,960
Patented Jan. 30, 1968

3,366,960
MICROWAVE RADIOMETRIC
NAVIGATION SYSTEM
Adolph M. Gluck, Woodcliff Lake, N.J., assignor to General Precision Systems Inc., a corporation of Delaware
Filed Nov. 1, 1966, Ser. No. 591,228
8 Claims. (Cl. 343—112)

This invention relates to navigation and, more particularly, to the determination of speed of a moving object relative to another object spaced from the moving object.

Proper navigation of a vehicle such as an airplane over the earth's surface entails, among other things, the knowledge of the altitude of the vehicle above the earth and its direction and speed relative to the earth, sometimes referred to as groundspeed. Various means have been devised for determining these factors, some being highly sophisticated. In the main, many of these prior systems, such as systems based on radar, have been quite satisfactory from the standpoints of accuracy and reliability and speed. However, a significant drawback is the relative complexity, size, weight and cost of such systems. For example, in a vehicle utilizing a typical system employing radar, a first unit is required to bounce a wave off the earth's surface and to detect its echo. A measurement of the time elapsed between transmittal and reception of such wave enables calculation of the altitude. The groundspeed of the vehicle is determinable by application of the Doppler principle, wherein frequency shifts between transmitted and received radar wave pulses enables determination of velocity of a vehicle. Thus, by separate transmitting means, echo-detecting means and Doppler shift determining means, altitude and groundspeed of the vehicle are determinable. However, in accordance with the foregoing, the signals radiated by the radar are detectable by extraneous means, rendering the presence and position of the vehicle detectable, often an undesirable situation in cases of warfare.

Accordingly, it is a principal object of this invention to facilitate the determination of groundspeed as well as altitude of a vehicle by the same radiation receiving apparatus.

It is a further object of this invention to facilitate the determination of groundspeed as well as altitude of a vehicle by passive, nonradiating apparatus.

The present invention utilizes radiometry, which is the detection and measurement of radiation energy. All bodies above absolute zero radiate electromagnetic energy. A body that is a good absorber of radiated energy is a good emitter and a poor reflector. Also, a good reflector of radiated energy is a poor absorber and a poor emitter. The best emitter will be that surface which is the best absorber and any surface which absorbs all the energy striking it will be the best emitter possible. Such a surface would reflect no energy and consequently be black in color.

A black body radiates at all wavelengths and the intensity of such radiation varies as a function of wavelength in accordance with Planck's law. Also, at any given wavelength, a body radiates more energy as its temperature is increased. However, in the case of objects other than black bodies, the physical temperature and radiometric temperature may vary appreciably. That is, the amount or intensity of radiation emitted from different objects at the same physical temperature may vary appreciably.

The distinction between radiometric and physical temperature or, in other words, the difference in emissivity of different materials at the same physical temperature, is useful in detecting certain objects even when their physical temperatures are the same as the temperature of surrounding, different objects. For instance, a metallic object has a much colder radiometric temperature (poorer emitter) than common earth terrain background even when its physical temperature is equivalent to or higher than that of the background. In a practical application, an object such as a motor vehicle could be detected from surrounding earth terrain. Similarly, for purposes of navigation, differences in terrain such as trees, rocks, plowed land and other distinct forms may be detected.

In accordance with this invention, a determination of velocity of a vehicle, such as an airplane, over a land area, is performed by tracking a radiometric image after the altitude of the vehicle has been determined; the tracking rate together with altitude providing the necessary data to allow calculation of the velocity.

The altitude of the vehicle is preferably determined by the apparatus utilized in the present invention or with as few additional components as possible so as to minimize cost, size, weight, power requirements, etc. Accordingly, a pair of spaced antennas on the vehicle are directed to receive radiometric radiations from the images on the terrain which are overlapping and with the apparatus as set forth and described in the application for Radiometric Altitude Measuring System by David M. Chiarello, Ser. No. 591,162 filed concurrently herewith and assigned to the present assignee, the altitude of the vehicle may be determined. Alternatively, one of the antennas is directed toward the earth and preferably at substantially 90 degrees relative to a base line between antennas and the rear antenna is tilted forward to detect and receive radiation from the same image at which the forward antenna is directed. A 90 degree angle between base line and antenna direction simplifier calculations; however, the forward antenna may be aimed at other angles requiring somewhat more complex calculations. A correlator is provided which receives the output of the receivers and provides for tilt control of the direction of the aft antenna so that there is substantial identity of received image. With the knowledge of spacing between antennas, tilt angle of rear antenna and right angle of forward antenna, the altitude is readily determinable by application of simple trigonometry. In either case, after a determination of the vehicle altitude, the rear antenna is controlled to track the image and with the knowledge of the altitude and rate of antenna tilt, the airplane velocity is readily determinable, also by simple trigonometry. Appropriate provision is made for determining drift by determining rate of lateral tilt of the tracking antenna.

Figure 2:
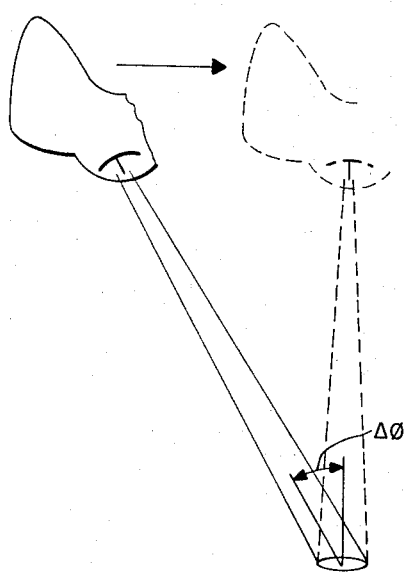
Figure 3:
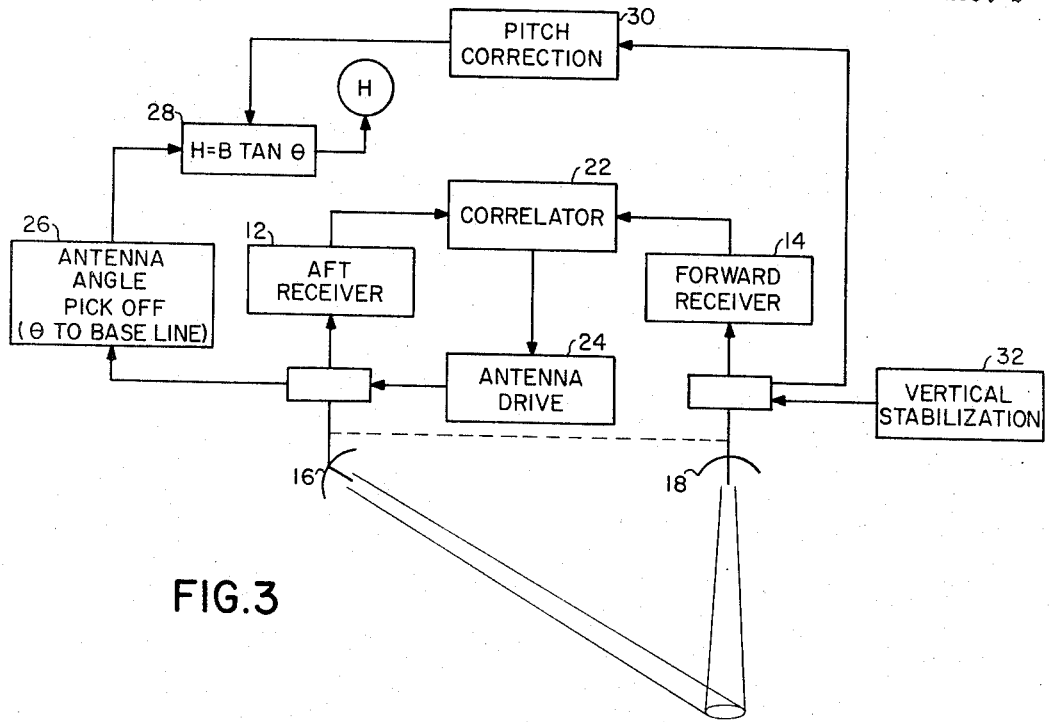
Figure 4:
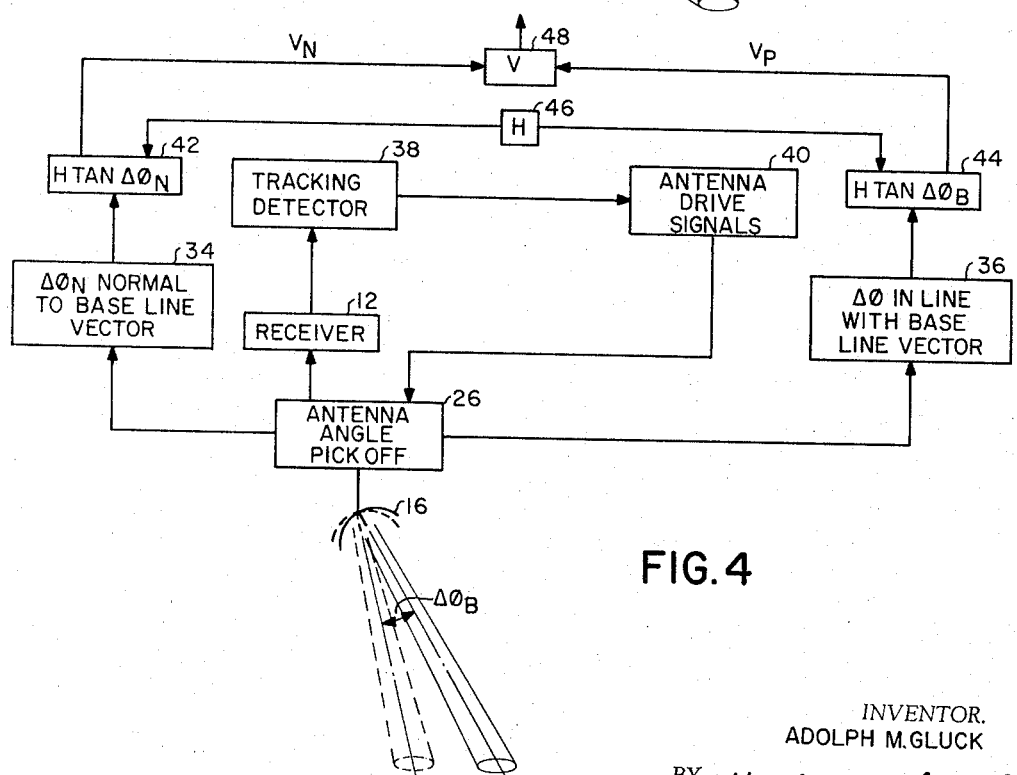

Other and further objects and advantages of the invention will become apparent from the following detailed description thereof taken with the accompanying drawings in which:

FIGURE 1 is a pictorial view, illustrating the manner in which a navigation system according to this invention may be utilized for determining altitude of a vehicle, such as an airplane, FIGURE 2 is a fractional, pictorial view, illustrating the manner in which a navigation system according to this invention may be utilized for determining the velocity of a vehicle, such as an airplane, FIGURE 3 is a functional block diagram of a navigation system which may be utilized for determining altitude, and FIGURE 4 is a functional block diagram of a navigation system according to this invention which may be utilized for determining the velocity of a craft, such as an airplane.

Figure 5:
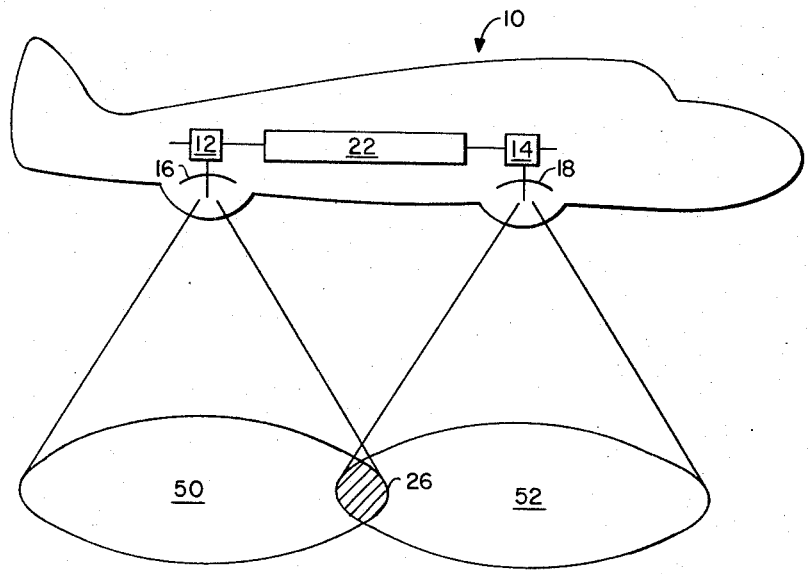
Figure 6:
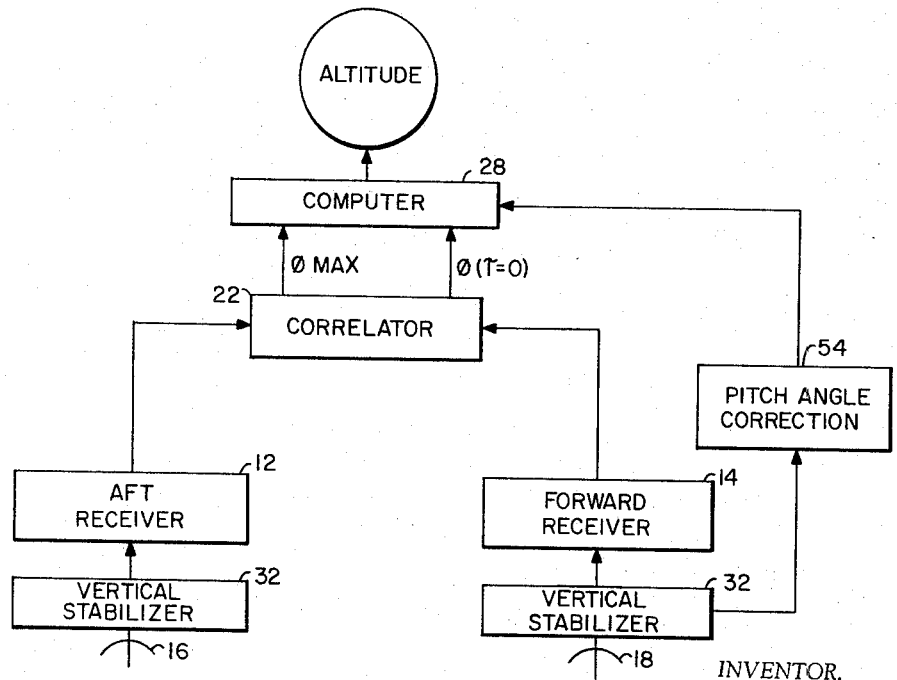

FIGURES 5 and 6 show a system for determining altitude in accordance with the above mentioned application by David M. Chiarello.

Referring now to the drawings for a more detailed description of the invention, in FIGURE 1, 10 represents an aircraft as being an example of an environment in which the present invention is applicable and includes a pair of spaced radiometric receivers 12 and 14 being spaced apart at a distance designated B along the fuselage of the craft and the receivers are operable with respective receiving antennas 16 and 18. As shown in FIGURE 1, when the aircraft is in straight and level flight, the respective receivers 12 and 14 are disposed in a substantially horizontal relationship with respect to each other and the antenna 18 may be aimed or disposed so as to receive electromagnetic wave radiation from an area substantially at right angles with a line between the two receivers. Such an area is designated at 20 and may be a distinctive portion of terrain on the earth's surface, such as a tree or group of trees, rocks, etc. The antenna 16 is tiltable forwardly so as to receive radiation from the same surface area 20 and, in such a position, assumes an angle θ with respect to a straight line between the receivers. With the knowledge of the distance B between the receivers 12 and 14, the magnitude of the angle θ, and the fact that a line between area 20 and antenna 18 is at right angles to a line between the receivers, by simple trigonometry, the distance between antenna 18 and the surface portion 20 may readily be determined to be equal to B tangent θ. It is to be noted that in FIGURE 1 of the drawings, the relative distances B and altitude H from surface portion 20 to antenna 18 is unrealistic for purposes of explaining and emphasizing the principle involved. In actuality, the distance H would be manyfold greater than the distance B.

With the knowledge of the altitude or distance between antenna 18 and surface portion 20, the velocity of the aircraft 10 may be determined by tracking the surface area 20 with the antenna 16, for example. This is illustrated in FIGURE 2 of the drawings, wherein the arrow designates the forward movement of the aircraft and the solid and dotted radiation patterns represent, respectively, the patterns of reception by the antenna 16 at spaced locations and, thus, at different moments of time. Thus, as the aircraft moves forward in flight, the angle between the surface portion 20 and the antenna 16 changes by an amount designated $\Delta\phi$. Accordingly, with the knowledge of the magnitude of the angle $\Delta\phi$, the velocity of the craft may be determined simply as being $$H \times \frac{\Delta\phi}{\Delta T}$$

wherein $\Delta T$ is the interval of time required for the antenna to tilt by the amount $\Delta\phi$.

The details of the interrelationship between receivers and associated equipment for performing the altitude and velocity determination described hereinabove are shown in FIGURES 3 and 4 of the drawings. In FIGURE 3, for assuring the coincidence of the pattern received by the respective antennas 16 and 18 in an altitude determination phase, a correlator apparatus 22 is provided and is coupled to receive the output from each of the receivers 12 and 14. The correlator 22 may take the form of various known types of correlators, either digital or analog, and provides an output to an antenna drive unit 24 which is responsive to the output produced by the correlator 22 to appropriately orient the antenna 16 until a coincidence or correlation between the patterns received by the forward and rear antennas is the same.

An antenna angle pickoff unit 26 is coupled to the antenna 16 and provides an output signal to a computer unit 28 which is responsive to the angle θ provided by the unit 26 to perform the necessary computations to determine the magnitude H, the altitude of the aircraft above the pattern 20. To account for the shortening of the base line B, in response to pitching of the aircraft 10, a pitch correction apparatus 30 is provided and is coupled to the forward antenna 18 and applies pitching data the the computer 28 to enable the appropriate corrections to be incorporated in the computations. A vertical stabilization unit 32 is provided and may incorporate a gyro for maintaining stabilization of the antenna 18, notwithstanding any erratic movement or motions of the aircraft 10.

The details of the apparatus and circuitry involved in tracking a pattern, such as surface area 20, for determining the velocity of an aircraft 10, are shown in detail in FIGURE 4 of the drawing. As shown in this figure, the antenna angle pickoff apparatus 26 provides the angle of the surface 20 relative to a base line vector along the line of flight and also the angle of the surface 20 perpendicular to a base line. Inasmuch as the antenna in this mode of operation of the unit is constantly tracking a surface area such as 20, the increment in these respective angles is also provided and is applied to respective units 34 and 36 which determine the increment in angle, normal to the base line and parallel to the base line, respectively. The electromagnetic wave output of the antenna angle pickoff is applied to receiver 12 and the output of the receiver 12 is applied to tracking detector unit 38. In this unit, a determination is made as to whether the image or pattern of radiation received is uniform and the output of this unit is applied to an antenna drive signal unit 40 which controls the angle of the antenna 16 so as to maintain a uniform image and effect tracking of the image.

The units 34 and 36 provide increment in angle information to computer units 42 and 44 which are effective, respectively, to multiply the magnitude of the altitude H by the tangent of an increase or increment of respective normal and parallel angles occurring in a unit of time. The output of these respective computer units 42 and 44 are velocity normal and velocity parallel, respectively, to a base line vector and for determining a resulting velocity these components of velocity are applied to a computer unit 48, which is effective to determine such resultant velocity to be displayed or applied in signal form to other computer units.

As an alternative means and method for determining the altitude of the craft 10, as shown in FIGURES 5 and 6 of the drawings, the two antennas 16 and 18 may be directed downwardly from the craft 10 so as to receive substantially parallel beams of radiometric radiation from images which are overlapping as shown at 50 and 52. The signals received from these images by these antennas are applied to the respective receivers 12 and 14 which in turn provide output signals to the correlating apparatus 22. The antennas 16 and 18 are directed so as to be able to receive such cones of radiation and the extent of directivity of these antennas is selected so as to be operable within predetermined ranges of altitude above the surface of the earth. Such range of operability requires that the antennas within the range have the overlapping images shown and that at altitudes below a predetermined minimum wherein the images no longer overlap, the system becomes non-functional. Also, at altitudes above some predetermined maximum the increase in overlapping area with increasing altitude becomes negligible at which point the system reaches a limit. The system, as shown in FIGURE 5, thus is functional to measure the extent of overlap of the images received and to correlate such overlapping area to determine the altitude of the craft above the surface of the earth.

Reference is now made to FIGURE 6 of the drawing, showing the details of the system in FIGURE 5. As shown in this figure, the antennas 16 and 18 are mounted and controlled in orientation by respective vertical stabilizer units 32 and 32'. In the normal operation of this system, the antennas 16 and 18 are directed so as to receive substantially parallel beams of radiation from the surface of the earth or, in other words, when the craft 10 is flying over flat terrain the beams received by these respective antennas are substantially perpendicular to the earth's surface. The signals received by the respective antennas are applied to receivers 14 and 12, the receiver 14 being the forward receiver and the receiver 12 being the aft receiver of the aircraft. These receivers may be of any suitable type such as superheterodyne or tuned radio frequency receivers for broad band operation. The outputs of these respective receivers are applied to correlator unit 22.

In a manner fully described in the above-mentioned application, the altitude of the craft is calculated in computer 28, utilizing the correlation of patterns at zero time delay and at a maximum correlation. Calculations of altitude of craft 10 above the earth's surface requires as one factor, the horizontal spacing between the antennas 16 and 18 and, thus, in situations wherein the craft 10 is not in straight and level flight or, in other words, at a pitch angle, correlation must be made. Pitch angle correction unit 54 is provided which derives a signal from vertical stabilizer unit 32' producing an indication of the pitch angle. The output of the pitch angle correction unit 54 is applied as another input to computer 28. The computer 28, with data indicating the extent of correlation as a fraction of total correlation and the pitch angle of the aircraft, is effective to compute and determine the height of the aircraft above the surface of the earth.

While the present invention has been described in a preferred embodiment, it will be obvious to those skilled in the art that various modifications can be made therein within the scope of the invention, and it is intended that the appended claims cover all such modifications.

What is claimed is:

1. A navigation system comprising a pair of radiometric receiving means spaced apart along a base line, and being movable in unison over an image, each of said receiving means having a directional antenna means, means for directing a first of said antenna means for receiving the radiation from an image substantially directly below said first antenna, means for directing the second antenna means at said image and means for determining the directed angle of said second antenna means with respect to said base line whereby the distance between said base line and said image is trigonometrically determinable, means for tracking said image with one of said antenna means and means for determining the angular rate of movement of said tracking antenna means whereby the rate of movement of said antenna means relative to said image is determinable.

2. A navigation system according to claim 1, additionally comprising correlation means coupled to each of said receiving means for determining maximum correlation of said respective antenna means on said image and means responsive to said correlation means for controlling the angular direction of said second antenna means relative to said base line and for maximizing the extent of correlation between antenna means.

3. A navigation system according to claim 1, additionally comprising means for determining the shortest distance between said second antenna means and a line between said image and said first antenna means to form an anjusted base line, whereby the distance between said image and said first antenna means is accurately trigonometrically determinable despite the non-perpendicularity of said image from said base line.

4. A navigation system according to claim 1, wherein said means for determining the angular rate of movement of said tracking antenna means include a plane including said base line and means for determining the angular rate of movement of said tracking antenna means in a plane perpendicular to said base line, and means responsive to both of said rate determining means and to the distance between said image and said one antenna means for determining the rate and direction of movement of said receiving means relative to said image.

5. A navigation system comprising means for determining the altitude of the craft above a heterogenous terrain comprising a pair of spaced antennas on said craft and being capable of receiving radiation naturally emitted from said terrain, a pair of receivers coupled respectively to said antennas, correlating means coupled to both of said receivers, means for detecting overlapping images on said terrain by said antennas, means including said correlating means for detecting the extent of overlap of said images and for determining altitude of said craft above said terrain, means for tracking an image with one of said antennas and means determining the angular rate of movement of said tracking antenna means whereby the rate of movement of said antenna means relative to said image is determinable to determine the rate of movement of said craft above said terrain.

6. A navigation system according to claim 5, additionally comprising correlation means coupled to each of said receiving means for determining maximum correlation of said respective antenna means on said image and means responsive to said correlation means for controlling the angular direction of said second antenna means relative to said base line and for maximizing the extent of correlation between antenna means.

7. A navigation system according to claim 5, additionally comprising means for determining the shortest distance between said second antenna means and a line between said image and first antenna means to form an adjusted base line, whereby the distance between said image and said first antenna means is accurately trigonometrically determinable despite the non-perpendicularity of said image from said base line.

8. A navigation system according to claim 5, wherein said means for determining the angular rate of movement of said tracking antenna means includes a plane including said base line and means for determining the angular rate of movement of said tracking antenna means in a plane perpendicular to said base line, and means responsive to both of said rate determining means and to the distance between said image and said one antenna means for determining the rate and direction of movement of said receiving means relative to said image.

References Cited

UNITED STATES PATENTS

| | | |
|---|---|---|
| 1,854,122 | 4/1932 | Eaton. |
| 3,004,219 | 10/1961 | Albert. |

RODNEY D. BENNETT, *Primary Examiner.*

R. E. BERGER, *Assistant Examiner.*